United States Patent
De et al.

(10) Patent No.: US 8,065,283 B2
(45) Date of Patent: Nov. 22, 2011

(54) TERM SYNONYM GENERATION

(75) Inventors: Nilanjana De, Waterford, NY (US); Richard Karl Hansen, Troy, NY (US)

(73) Assignee: GlobalSpec, Inc., East Greenbush, NY (US)

( * ) Notice: Subject to any disclaimer, the term of this patent is extended or adjusted under 35 U.S.C. 154(b) by 313 days.

(21) Appl. No.: 12/019,420

(22) Filed: Jan. 24, 2008

(65) Prior Publication Data

US 2009/0193008 A1 Jul. 30, 2009

(51) Int. Cl.
G06F 7/00 (2006.01)

(52) U.S. Cl. .................. 707/705; 707/707; 707/708

(58) Field of Classification Search .......... 707/999.003, 707/999.004, 999.005, 705, 707, 708, 756
See application file for complete search history.

(56) References Cited

U.S. PATENT DOCUMENTS

| | | | |
|---|---|---|---|
| 5,442,781 A | 8/1995 | Yamagata | 395/600 |
| 5,469,355 A | 11/1995 | Tsuzuki | 364/419.19 |
| 5,659,730 A | 8/1997 | Kelley et al. | 395/603 |
| 5,873,056 A * | 2/1999 | Liddy et al. | 707/999.001 |
| 6,519,585 B1 * | 2/2003 | Kohli | 707/999.003 |
| 6,625,599 B1 * | 9/2003 | Bera | 707/999.006 |
| 6,728,696 B1 | 4/2004 | Walton | 707/2 |
| 7,024,405 B2 | 4/2006 | Salerno et al. | 707/3 |
| 7,152,064 B2 | 12/2006 | Bourdoncle et al. | 707/5 |
| 2001/0034768 A1 | 10/2001 | Bain et al. | 709/206 |
| 2002/0188528 A1 | 12/2002 | Adelman et al. | 705/28 |
| 2003/0101168 A1 | 5/2003 | Chow et al. | 707/3 |
| 2003/0187870 A1 | 10/2003 | Nakajima et al. | 707/102 |
| 2003/0220917 A1 | 11/2003 | Copperman et al. | 707/3 |
| 2004/0078366 A1 * | 4/2004 | Crooks et al. | 707/3 |
| 2004/0128318 A1 | 7/2004 | Peng et al. | 707/104.1 |
| 2004/0230574 A1 | 11/2004 | Kravets | 707/5 |
| 2005/0086219 A1 | 4/2005 | Martin | 707/3 |
| 2005/0114390 A1 | 5/2005 | Bjornson et al. | 707/102 |
| 2006/0053070 A1 | 3/2006 | Kumazawa | 705/28 |
| 2006/0074919 A1 | 4/2006 | Grover et al. | 707/10 |
| 2006/0161520 A1 | 7/2006 | Brewer et al. | 707/3 |
| 2006/0184434 A1 * | 8/2006 | Schickler | 707/100 |
| 2006/0206516 A1 | 9/2006 | Mason | 707/102 |
| 2006/0230015 A1 | 10/2006 | Gupta | 707/1 |
| 2006/0259479 A1 | 11/2006 | Dai | 707/4 |
| 2007/0094239 A1 | 4/2007 | Catucci et al. | 707/3 |
| 2007/0100803 A1 | 5/2007 | Cava | 707/3 |
| 2009/0125534 A1 * | 5/2009 | Morton et al. | 707/100 |

* cited by examiner

*Primary Examiner* — Vincent Boccio

(74) *Attorney, Agent, or Firm* — Wayne F. Reinke, Esq.; Heslin Rothenberg Farley & Mesiti P.C.

(57) ABSTRACT

Synonyms for a term to be indexed are dynamically generated by applying one or more rules (e.g., splitting, deletion or addition of characters, and concatenation of portions) to the term, each synonym generated either including only a portion and not all of the term or differing from the term by at least one additional character in a position between a first character and a last character (i.e., not at either end of the term). The term and some or all of the synonyms are then indexed for subsequent searching.

51 Claims, 3 Drawing Sheets

US 8,065,283 B2

TERM SYNONYM GENERATION

BACKGROUND OF THE INVENTION

1. Technical Field

The present invention generally relates to the generation of terms for search. More particularly, the present invention relates to generating synonyms for a term to be indexed, each of the synonyms including only part of the term.

2. Background Information

The Internet has vastly increased both the amount of information available to users and the speed with which it may be obtained. However, the vast increase in the amount of information has created a corresponding problem for users in finding the information of interest. Search engines have proliferated in an attempt to meet the information need.

However, a search engine is only as good as the information indexed for search, and the term(s) to be searched input by a user. Thus, if a user inputs, for example, only a portion of a term that would return the desired information, or misformats the term, it is less likely that the information actually being sought will be returned in the results. Although this is true for all searches, it is particularly so with respect to non-word searches, such as, for example, part numbers, model numbers and other such identifiers. Part numbers, for example, are seldom intuitive and are not formatted in any standard way. Thus, users frequently only know a portion of the actual part number and/or may add or omit non-alphanumeric characters, for example, spaces, dashes, etc.

It would be helpful if a user could more reliably search when a "perfect" term is not known or otherwise not available, particularly in the case of identifiers.

Thus, a need exists for a way to increase the accuracy of the search results even where the user only knows a portion of the information being sought and/or improperly formats the same.

SUMMARY OF THE INVENTION

Briefly, the present invention satisfies the need to increase the accuracy of search results where the user only knows a portion of the information being sought and/or improperly formats the same by applying one or more rules to the term to be indexed in order to dynamically generate synonyms that are indexed along with the original index term.

In accordance with the above, it is an object of the present invention to provide a way to improve search engine accuracy by dynamically generating and indexing one or more synonyms for a term being indexed.

The present invention provides, in a first aspect, a method of generating terms for indexing. The method comprises dynamically generating a plurality of synonyms for a term prior to indexing and prior to search term entry by a user, in order to identify potential errors in term entry at search time by a user and to identify potential partial term knowledge of a user at search time, the term being a part identifier, and each of the plurality of synonyms comprising a non-trivial portion of the term that is less than the entire term, and indexing the term and at least some of the plurality of synonyms for subsequent searching. Preferably, the dynamically generating comprises application of at least one synonym generating rule to the term.

System and computer program products corresponding to the above-summarized method are also described and claimed herein.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In its preferred form, the present invention improves searching by dynamically generating synonyms of a term being indexed (hereinafter, "index term," defined below) according to one or more rules, a given synonym either including only a portion or part of the term or differing from the term by at least one additional character in a position between a first character and a last character of the term. The generated synonyms are associated with the same document as the index term. The invention recognizes that not all users will utilize an ideal term or terms to search, particularly in the case of identifiers (e.g., part numbers and the like), but may only know a portion thereof and/or make formatting errors inputting the index term, and improves the search results by taking these considerations into account.

As used with the present invention, the phrase "index term" or "term" in the context of indexing for search refers to a character string of one or more characters associated with a document or other item for use by a search engine to identify the same. The character string may include one or more alphanumeric characters and/or one or more non-alphanumeric characters. Examples of index terms include words, phrases, and identifiers, e.g., part numbers, model numbers and the like.

As used herein, the term "alphanumeric characters" refers to numbers and upper and lower case letters of Latin-based languages (e.g., English). Conversely, the term "non-alphanumeric characters" refers to characters other than alphanumeric characters, for example, symbols, white space characters, and characters for languages other than Latin-based languages.

Figure 1:
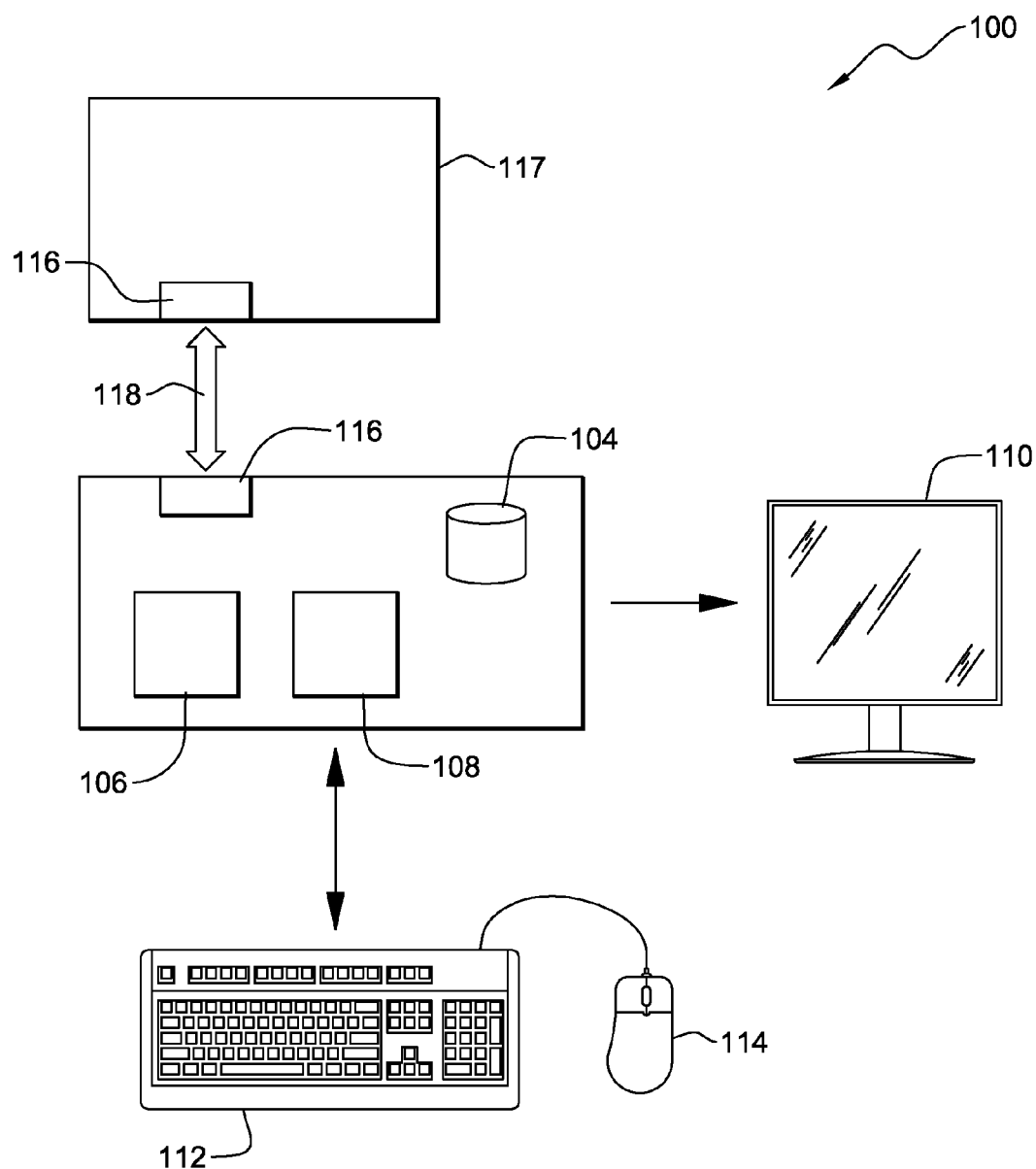
FIG. 1 is a block diagram of one example of computing environment implementing one or more aspects of the present invention.

FIG. 1 is a block diagram of one example of a computing environment 100 implementing the present invention. The computing environment comprises a computing unit 102. The computing unit includes, for example, an operating system stored on a computer-useable medium 104, one or more processors 106, memory 108 (e.g., RAM) and some type of user interface (e.g., monitor 110, keyboard 112 and pointing device 114, in this case a mouse). In addition, the computing unit also includes software stored on computer-useable medium 104 for interfacing with a search engine index 117. The index and computing unit are coupled via a network 118 using any standard connection 116, wired (e.g., Gigabit Ethernet) or wireless (e.g., IEEE 802.11a, b, g or n standards). The network comprises any type of private or public network. One example of a private network is a Local Area Network or LAN. One example of a public network is the Internet. Optionally, the connection can be encrypted or otherwise made secure, particularly where a public network is used, for example, using SSL (Secure Sockets Layer) encryption.

It will be understood that the computing unit and index of FIG. 1 could be geographically separated, or they could be local to each other, or even part of the same computing unit.

Figure 2:
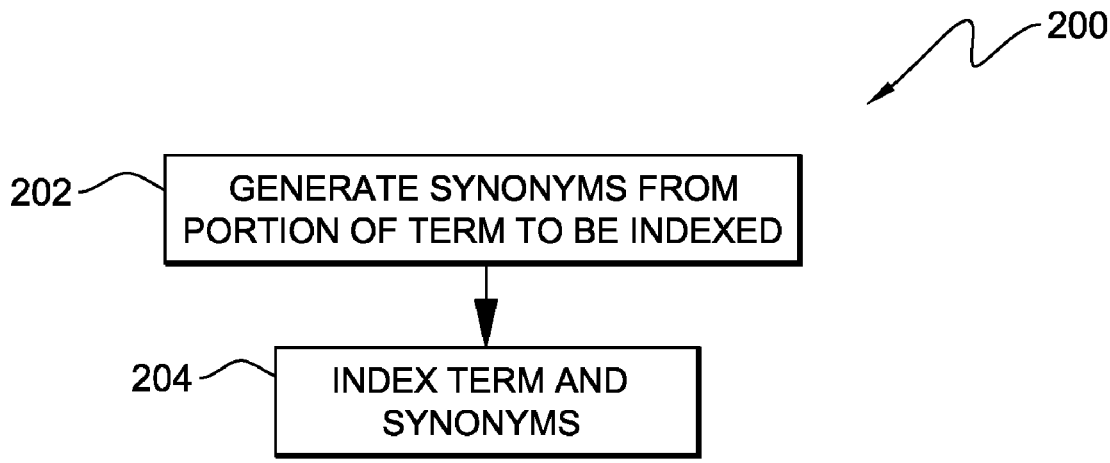
FIG. 2 is a flow diagram of one example of a method of generating terms for indexing in accordance with another aspect of the present invention.

FIG. 2 is a flow diagram 200 of one example of a method of generating index terms, in accordance with the present invention. The method, at a high level, comprises dynamically generating a plurality of synonyms for an index term prior to indexing, Step 202. In the context of FIG. 1, for example, the method may be implemented using computing unit 102 from FIG. 1. More specifically, software stored, for example, on media 116 may execute via processor 106 to perform the generating and indexing. Each of the plurality of synonyms either comprises only a portion of the index term or differs from the term by at least one additional character in a position between a first character and a last character of the term. In the case where a synonym comprises only a portion of the index term, the synonym may include additional aspects other than the portion of the index term, but with respect to the index term, includes only part and not the entire index term. Recall that a part of the problem sought to be solved is a user knowing only a portion of a term to search. The method further comprises indexing the index term and at least some of the plurality of synonyms for subsequent searching, Step 204. As one skilled in the art will know, the term "indexing" in this context refers to the process of converting a collection of data into a specialized database suitable for search and retrieval. In one example of indexing, one or more terms in the document are associated with that document in the database.

Preferably, the present invention is implemented as computer software in a computer programming language, such as, for example, the JAVA programming language. However, other languages could of course be used (e.g., C++). Alternatively, the present invention can be implemented in hardware, for example, integrated circuit logic.

Preferably, dynamically generating the plurality of synonyms comprises application of at least one synonym generating rule to the index term, though other ways of generating synonyms could be used (e.g., randomly splitting the index term). The following are examples of currently contemplated synonym generating rules. However, it will be understood that different or additional synonym generating rules could be developed that fall within the scope of the present invention.

As a first example, the synonym generating rule can take the form of deleting at least one non-alphanumeric character from the index term. Deleting is different from splitting and includes rejoining the remaining characters. For example, the index term "AB-CD-EF" may become "ABCD-EF." In a variation on the first example, deleting at least one non-alphanumeric character from the index term comprises deleting all non-alphanumeric characters to create one of the synonyms. Thus, "AB-CD-EF" becomes ABCDEF.

In a second example building on the synonym generating rule of the first example, deletion of the at least one non-alphanumeric character from the index term comprises deleting at least one white space character (e.g., blank, space, tab, etc.) from the index term. For example, the index term "AB CD EF" creates the synonyms "ABCD EF," "AB CDEF," "ABCD (i.e. dropping "EF") and "CDEF." In a variation on the second example, deleting at least one white space character comprises deleting all white space characters from the index term to create one of the synonyms. Thus, "AB CD EF" becomes "ABCDEF."

In a third example, the synonym generating rule comprises splitting the index term at least one non-alphanumeric character to create at least two parts, deleting the at least one non-alphanumeric character, at least one of the at least two parts being part of or all of a synonym. For example, the term AB-CD-EF splits into: AB and CD-EF; or AB, CD, EF; or AB-CD, EF. Thus, the synonym(s) created could be any or all from each of the three scenarios.

Figure 3:
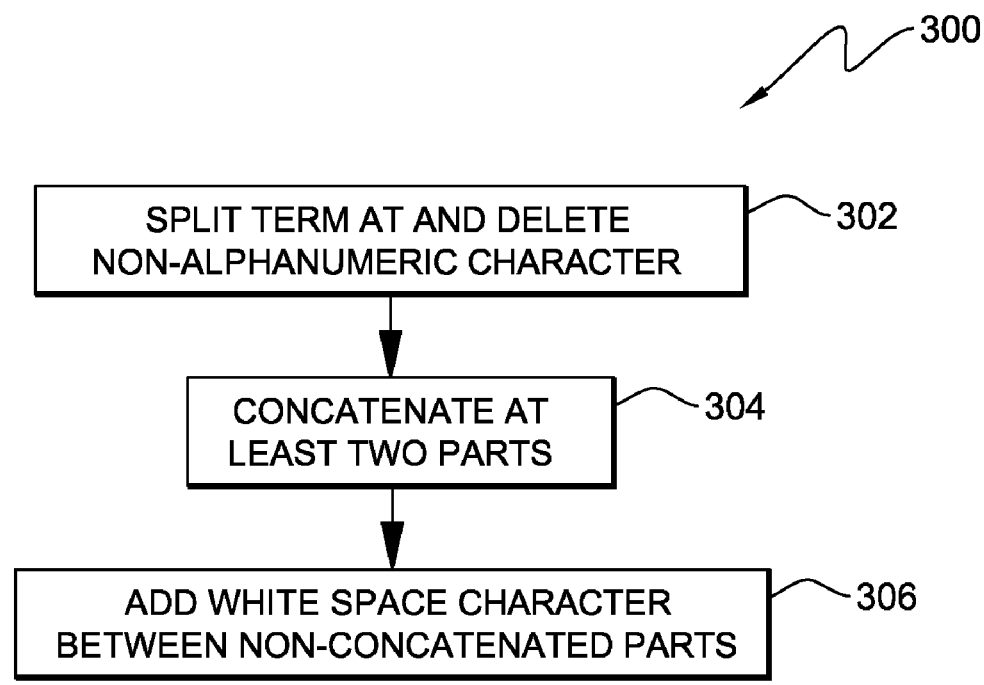
FIG. 3 is a flow diagram of one example of a synonym generating rule in accordance with another aspect of the present invention.

FIG. 3 is a flow diagram 300 of a fourth example of a synonym generating rule, in accordance with the present invention. The synonym generating rule of the generating step comprises splitting the index term at and deleting at least one non-alphanumeric character to create at least two parts, Step 302. For example, AB-CD-EF becomes, e.g., AB, CD and EF (i.e., three parts in this example, though it could just be two parts if split at only one "dash"). The generating further comprises concatenating at least two of the parts in original order starting from each of the parts within the index term, Step 304. A white space character is inserted between any parts not concatenated. Note that one or more parts may be dropped in a given synonym. Thus, in this example, the following synonyms are created: ABCD EF; ABCDEF; AB CDEF; ABCD and CDEF.

Figure 4:
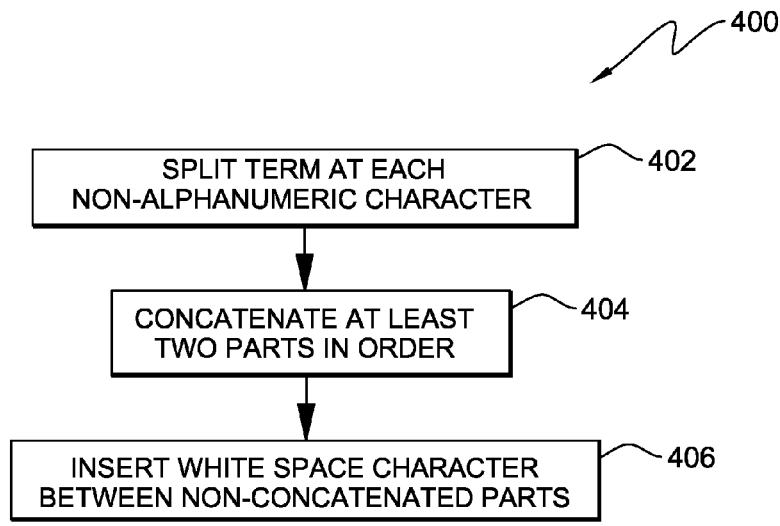
FIGS. 4 and 5 are flow diagrams of additional examples of synonym generating rules in accordance with other aspects of the present invention.

In an alternative to the fourth example rule, shown in flow diagram 400 of FIG. 4, the splitting comprises splitting the index term at each non-alphanumeric character to create at least two parts, e.g., three parts, Step 402. Keeping the parts in original order relative to each other, the alternative further comprises concatenating at least two of the parts, Step 404, and inserting a white space character between non-concatenated parts as in the fourth example, Step 406.

Figure 5:
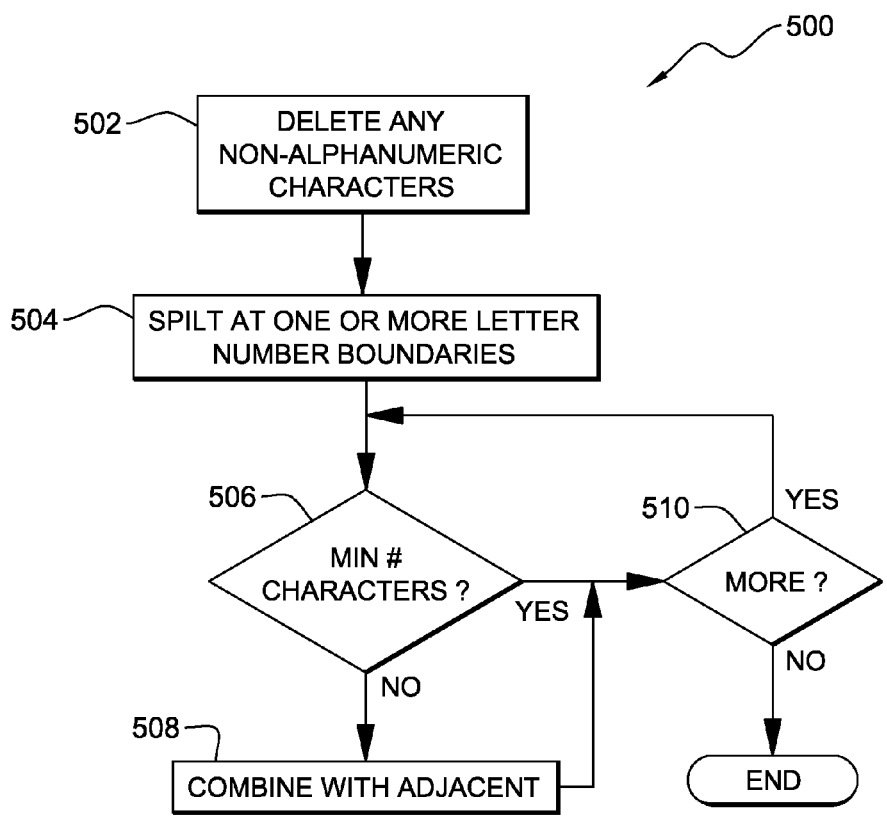

FIG. 5 is a flow diagram 500 of a fifth example of a synonym generating rule. The rule comprises deleting any non-alphanumeric characters present from the index term to create a reduced index term, Step 502, and splitting the reduced index term at least one letter-number boundary to create at least two of the plurality of synonyms, Step 504. Note that there may not be any non-alphanumeric characters present in a given term. Optionally, if the splitting results in a synonym of less than a minimum number of characters, Inquiry 506, then it is combined with at least one of the others immediately adjacent thereto created by the splitting, Step 508, to create at least one of the at least two of the plurality of synonyms. This optional step is performed for each synonym created by the splitting, Inquiry 510.

In a sixth example, the synonym generating rule comprises splitting the term at least one letter-digit boundary to create at least two parts, at least one of the at least two parts being part of or all a synonym. For example, the term AB2345 splits into: AB and 2345. Thus, the synonym(s) chosen may comprise either or both of them.

Preferably, each of the plurality of synonyms generated, e.g., by any of the rules above, comprises a minimum character length. For example, a minimum character length of two could be used, including alphanumeric and/or non-alphanumeric characters as noted herein. Synonyms not meeting the minimum character requirement are not indexed.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or provided separately.

An article of manufacture or a computer program product incorporating one or more aspects of the present invention includes, for instance, one or more computer usable media to store computer readable program code means or logic thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (e.g., CD-R and CD-R/W), DVD (e.g., DVD+/−R; DVD+/−R/W; DVD-RAM; DVD DL), and high-definition DVD (e.g., Blu-ray or HD-DVD).

A sequence of program instructions or a logical assembly of one or more interrelated modules defined by one or more computer readable program code means or logic direct the performance of one or more aspects of the present invention. Alternatively, the present invention can be implemented in hardware, e.g., integrated circuit logic.

Advantageously, the present invention increases the probability of returning relevant search results where an ideal index term is either not fully known, or not properly formatted by a user. An ideal index term (e.g., a part number) is dynamically split into parts and/or manipulated in other ways to dynamically generate synonyms likely to be entered by a user. These synonyms are indexed along with the ideal index term to increase the accuracy of the results.

Although various embodiments are described above, these are only examples. Other variations are possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of generating terms for indexing, comprising:
dynamically generating a plurality of synonyms for a term prior to indexing and prior to search term entry by a user, in order to identify potential errors in term entry at search time by a user and to identify potential partial term knowledge of a user at search time, wherein the term is a part identifier, and wherein each of the plurality of synonyms comprises a non-trivial portion of the term that is less than the entire term; and
indexing the term and at least some of the plurality of synonyms for subsequent searching.

2. The method of claim 1, wherein the dynamically generating comprises application of at least one synonym generating rule to the term.

3. The method of claim 2, wherein the at least one synonym generating rule comprises splitting the term into at least two terms.

4. The method of claim 3, wherein the at least one synonym generating rule further comprises concatenating at least two of the at least two terms.

5. The method of claim 2, wherein the at least one synonym generating rule further comprises splitting the term at at least one letter-number boundary.

6. The method of claim 2, wherein the at least one synonym generating rule further comprises splitting the term at at least one non-alphanumeric character.

7. The method of claim 2, wherein the at least one synonym generating rule comprises deleting at least one non-alphanumeric character from the term.

8. The method of claim 7, wherein the at least one synonym generating rule comprises deleting at least one white space character from the index term to create at least one of the plurality of synonyms.

9. The method of claim 8, wherein the deleting comprises deleting all white space characters from the term.

10. The method of claim 7, wherein the at least one synonym generating rule comprises deleting all non-alphanumeric characters from the term to create at least one of the plurality of synonyms.

11. The method of claim 2, wherein the at least one synonym generating rule comprises splitting the term at at least one non-alphanumeric character to create at least two parts, wherein the plurality of synonyms comprises at least one of the at least two parts.

12. The method of claim 2, wherein the at least one synonym generating rule comprises:
   splitting the term at and deleting at least one non-alphanumeric character to create at least two parts; and
   concatenating at least two of the at least two parts in order starting from each of the at least two parts.

13. The method of claim 12, further comprising adding a white space character in at least one synonym between non-concatenated parts.

14. The method of claim 2, wherein the at least one synonym generating rule comprises deleting any non-alphanumeric characters from the term to create a reduced term, and splitting the reduced term at at least one letter-number boundary to create at least two of the plurality of synonyms.

15. The method of claim 14, wherein if the splitting results in a term of less than a minimum number of characters, then the term is combined with at least one of the other terms immediately adjacent thereto created by the splitting to create at least one of the at least two of the plurality of synonyms.

16. The method of claim 1, wherein each of the plurality of synonyms comprises a minimum character length.

17. The method of claim 1, wherein the part identifier is a part number.

18. A system for generating terms for indexing, comprising:
   at least one processor for dynamically generating a plurality of synonyms for a term prior to indexing and prior to search term entry by a user, in order to identify potential errors in term entry at search time by a user and to identify potential partial term knowledge of a user at search time, the term being a part identifier, wherein the term is an item identifier, and wherein each of the plurality of synonyms comprises a non-trivial portion of the term that is less than the entire term; and
   at least one processor for indexing the term and at least some of the plurality of synonyms for subsequent searching.

19. The system of claim 18, wherein the at least one processor for dynamically generating comprises at least one processor for applying at least one synonym generating rule to the term.

20. The system of claim 19, wherein the at least one processor for applying comprises at least one processor for splitting the term into at least two terms.

21. The system of claim 20, wherein the at least one processor for applying further comprises at least one processor for concatenating at least two of the at least two terms.

22. The system of claim 19, wherein the at least one processor for applying at least one synonym generating rule further comprises at least one processor for splitting the term at at least one letter-number boundary.

23. The system of claim 19, wherein the at least one processor for applying at least synonym generating rule further comprises at least one processor for splitting the term at at least one non-alphanumeric character.

24. The system of claim 19, wherein the at least one processor for applying comprises at least one processor for deleting at least one non-alphanumeric character from the term.

25. The system of claim 24, wherein the at least one processor for applying comprises at least one processor for deleting at least one white space character from the term to create at least one of the plurality of synonyms.

26. The system of claim 25, wherein the at least one processor for deleting comprises at least one processor for deleting all white space characters from the term.

27. The system of claim 24, wherein the at least one processor for applying comprises at least one processor for deleting all non-alphanumeric characters from the term to create at least one of the plurality of synonyms.

28. The system of claim 19, wherein the at least one processor for applying comprises at least one processor for splitting the term at at least one non-alphanumeric character to create at least two parts, wherein the plurality of synonyms comprises at least one of the at least two parts.

29. The system of claim 19, wherein the at least one processor for applying comprises:
   at least one processor for splitting the term at and deleting at least one non-alphanumeric character to create at least two parts; and
   at least one processor for concatenating at least two of the at least two parts in order starting from each of the at least two parts.

30. The system of claim 29, further comprising at least one processor for adding a white space character in at least one synonym between non-concatenated parts.

31. The system of claim 19, wherein the at least one processor for applying comprises at least one processor for deleting any non-alphanumeric characters from the term to create a reduced term and splitting the reduced term at at least one letter-number boundary to create at least two of the plurality of synonyms.

32. The system of claim 31, wherein if the splitting results in a term of less than a minimum number of characters, then the term is combined with at least one of the other terms immediately adjacent thereto created by the splitting to create at least one of the at least two of the plurality of synonyms.

33. The system of claim 18, wherein each of the plurality of synonyms comprises a minimum character length.

34. The system of claim 18, wherein the part identifier is a part number.

35. An article of manufacture comprising:
   at least one non-transitory computer usable medium encoded with computer readable program code logic to facilitate generating terms for indexing, the computer readable program code logic when executing performing the following:
      dynamically generating a plurality of synonyms for a term prior to indexing and prior to search term entry by a user, in order to identify potential errors in term entry at search time by a user and to identify potential partial term knowledge of a user at search time, the term being a part identifier, wherein the term is an item identifier, and wherein each of the plurality of synonyms comprises a non-trivial portion of the term that is less than the entire term; and
      indexing the term and at least some of the plurality of synonyms for subsequent searching.

36. The article of manufacture of claim 35, wherein the dynamically generating comprises application of at least one synonym generating rule to the term.

37. The article of manufacture of claim 36, wherein the at least one synonym generating rule comprises splitting the term into at least two terms.

38. The article of manufacture of claim 37, wherein the at least one synonym generating rule further comprises concatenating at least two of the at least two terms.

39. The article of manufacture of claim 36, wherein the at least one synonym generating rule further comprises splitting the term at at least one letter-number boundary.

40. The article of manufacture of claim 36, wherein the at least one synonym generating rule further comprises splitting the term at at least one non-alphanumeric character.

41. The article of manufacture of claim 36, wherein the at least one synonym generating rule comprises deleting at least one non-alphanumeric character from the term.

42. The article of manufacture of claim 41, wherein the at least one synonym generating rule comprises deleting at least one white space character from the term to create at least one of the plurality of synonyms.

43. The article of manufacture of claim 42, wherein the deleting comprises deleting all white space characters from the term.

44. The article of manufacture of claim 41, wherein the at least one synonym generating rule comprises deleting all non-alphanumeric characters from the term to create at least one of the plurality of synonyms.

45. The article of manufacture of claim 36, wherein the at least one synonym generating rule comprises splitting the term at at least one non-alphanumeric character to create at least two parts, wherein the plurality of synonyms comprises at least one of the at least two parts.

46. The article of manufacture of claim 36, wherein the at least one synonym generating rule comprises:
splitting the term at and deleting at least one non-alphanumeric character to create at least two parts; and
concatenating at least two of the at least two parts in order starting from each of the at least two parts.

47. The article of manufacture of claim 46, wherein the at least one synonym generating rule further comprises adding a white space character in at least one synonym between non-concatenated parts.

48. The article of manufacture of claim 36, wherein the at least one synonym generating rule comprises deleting any non-alphanumeric characters from the term to create a reduced term, and splitting the reduced term at at least one letter-number boundary to create at least two of the plurality of synonyms.

49. The article of manufacture of claim 48, wherein if the splitting results in a term of less than a minimum number of characters, then the term is combined with at least one of the other terms immediately adjacent thereto created by the splitting to create at least one of the at least two of the plurality of synonyms.

50. The article of manufacture of claim 35, wherein each of the plurality of synonyms comprises a minimum character length.

51. The article of manufacture of claim 35, wherein the part identifier is a part number.

\* \* \* \* \*